United States Patent
Keuth

(10) Patent No.: US 7,351,178 B2
(45) Date of Patent: Apr. 1, 2008

(54) DIRECTLY DRIVEN DRIVE AXLE WITH A GEAR TRAIN COMPRISING AN AXIALLY-FIXED SUN PINION

(75) Inventor: Karl-Heinz Keuth, Krefeld (DE)

(73) Assignee: Ewald Speth Antriebstechnik (DE)

( * ) Notice: Subject to any disclaimer, the term of this patent is extended or adjusted under 35 U.S.C. 154(b) by 213 days.

(21) Appl. No.: 10/526,500

(22) PCT Filed: Sep. 2, 2003

(86) PCT No.: PCT/DE03/02896

§ 371 (c)(1),
(2), (4) Date: Jul. 19, 2005

(87) PCT Pub. No.: WO2004/022375

PCT Pub. Date: Mar. 18, 2004

(65) Prior Publication Data

US 2006/0009324 A1    Jan. 12, 2006

(30) Foreign Application Priority Data

Sep. 2, 2002   (DE) .......................... 202 13 669 U

(51) Int. Cl.
*F16H 37/08*   (2006.01)
(52) U.S. Cl. .................. 475/204; 475/5; 475/221; 475/230; 475/343; 475/344; 180/65.5; 180/65.6; 180/372
(58) Field of Classification Search ...................... None
See application file for complete search history.

(56) References Cited

U.S. PATENT DOCUMENTS

| 4,611,505 | A |   | 9/1986 | Cronin et al. |
| 4,684,330 | A |   | 8/1987 | Andersson et al. |
| 5,396,968 | A | * | 3/1995 | Hasebe et al. ............. 180/65.6 |
| 5,533,943 | A | * | 7/1996 | Ichioka et al. ............. 475/198 |
| 5,620,387 | A | * | 4/1997 | Janiszewski ................ 475/150 |
| 5,637,048 | A | * | 6/1997 | Maeda et al. ............... 475/150 |
| 5,643,127 | A | * | 7/1997 | Yoshii et al. ............... 475/160 |
| 5,718,302 | A | * | 2/1998 | Hasebe et al. ............. 180/65.6 |

FOREIGN PATENT DOCUMENTS

DE    200 10 563    11/2003

* cited by examiner

*Primary Examiner*—David D. Le
(74) *Attorney, Agent, or Firm*—Robert W. Becker; Robert W. Becker & Assoc.

(57) ABSTRACT

A driving axle for a vehicle driven by an electric motor disposed on a driven motor shaft. Drive shafts are coupled to the motor shaft via the interposition of a reduction transmission stage and a following differential transmission. As part of the transmission stage an externally toothed sun pinion is disposed on the motor shaft, which is mounted in motor shaft bearings connected to a gearbox and absorbing radial and axial forces. A sleeve is disposed between, and supported on opposite sides against, the motor shaft bearings and sun pinion. A securing device is disposed on the free end of the motor shaft for fixing the sun pinion against the sleeve. Gears of the transmission stage mesh with the sun pinion, which together with the gears are embodied as helical gears having a force component acting in the direction of the motor shaft bearings.

5 Claims, 1 Drawing Sheet

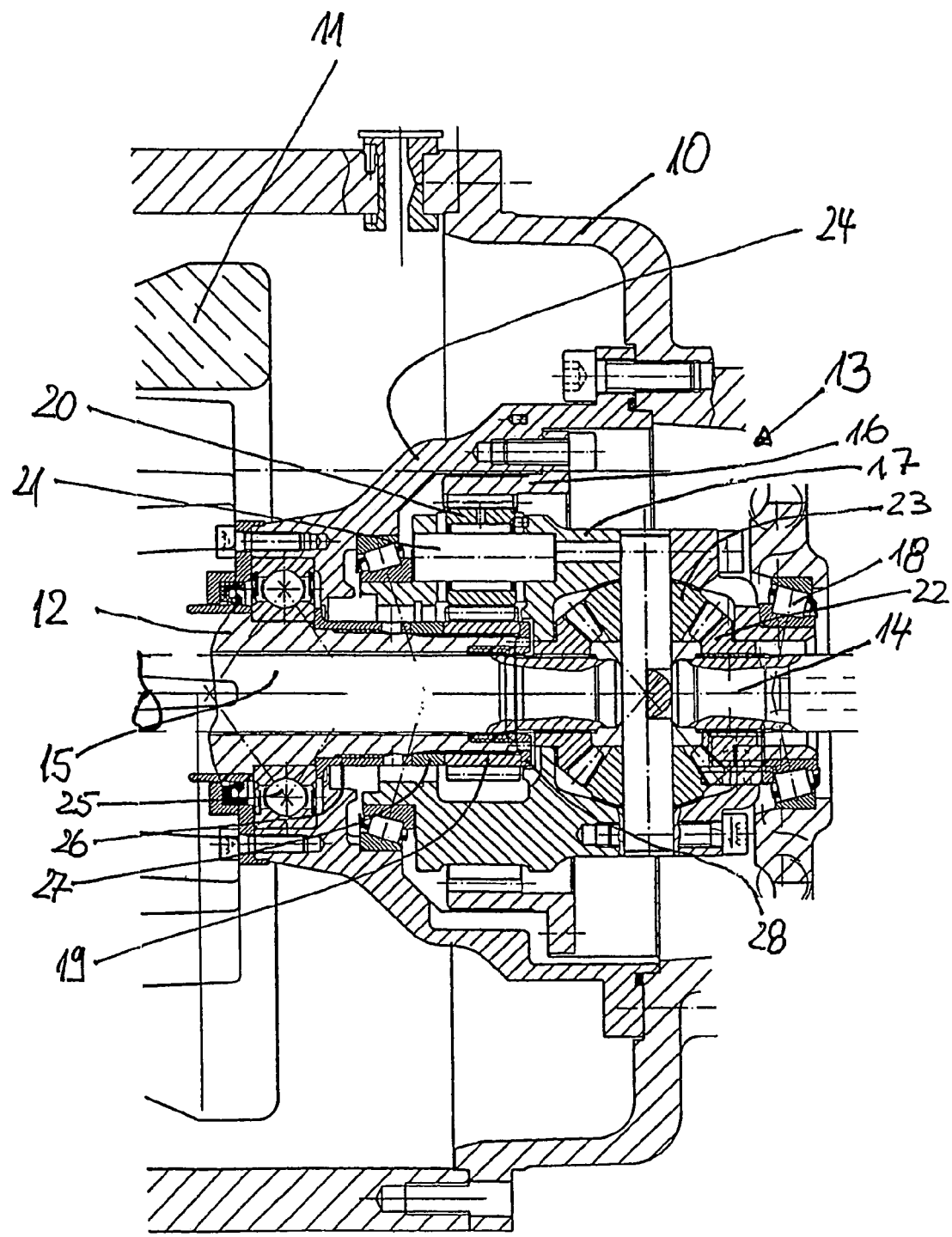

DIRECTLY DRIVEN DRIVE AXLE WITH A GEAR TRAIN COMPRISING AN AXIALLY-FIXED SUN PINION

The specification incorporates by reference the disclosure of German priority document 202 13 669.8 filed Sep. 2, 2002 and PCT/DE2003/002896 filed Sep. 2, 2003.

BACKGROUNG OF THE INVENTION

The invention relates to a driving axle for electrically driven vehicles with an electric motor disposed on the driven motor shaft, and with drive shafts which are coupled to the motor shaft, accompanied by the interposition of a reduction transmission stage as well as a subsequent differential transmission, and which are intended for the wheel respectively seated thereon, whereby as a portion of the reduction transmission an externally toothed sun pinion is disposed on the motor shaft that is mounted in motor shaft bearings connected with the gearbox of the transmission stage.

A driving axle having the aforementioned features is described in DE 200 10 563 U1. To the extent that with the known driving axle there is already connected between the motor shaft and the differential transmission a further reduction planetary transmission, the special construction described in DE 200 10 563 U1 is characterized in that the planetary function and the differential function are unified in a planetary differential cage that rotates in an internally toothed gear that is fixed on the housing in such a way that the planet gear, which is driven by the sun pinion that is disposed on the motor shaft, is mounted in the planetary differential cage and meshes with the inner toothing of the internal gear that extends externally about the planetary differential cage.

The known driving axle has the drawback that the bevel gearing that forms the differential transmission stage applies, via the planetary gearing that is structurally unified therewith, axial forces to the sun pinion that is connected with the motor shaft, so that the sun pinion shifts on the motor shaft accompanied by a considerable simultaneous wear of the thrust washer that holds the sun pinion on the motor shaft. This can make the driving axle entirely unusable.

It is therefore an object of the invention to provide a driving axle having the aforementioned features that avoids the aforementioned drawback.

SUMMARY OF THE INVENTION

The basic concept of the invention is that the motor shaft bearings are embodied as bearings that absorb radial and axial forces, and a sleeve is disposed between the motor shaft bearings and the sun pinion and is supported on both sides against the motor shaft bearings and the sun pinion, and the sun pinion is fixed against the sleeve by a securing means that is disposed on the free end of the motor shaft, and in that the sun pinion, and the gears of the reduction transmission stage that mesh therewith, are embodied as helical gears having a force component that acts in the direction of the motor shaft bearings.

The invention has the advantage that due to the interposition of the sleeve between sun pinion and motor shaft bearings, the sun pinion is fixed against shifting upon the motor shaft. To the extent furthermore that axial forces act upon the sun pinion, these axial forces are now transferred with structural alignment, via the sleeve, to the motor shaft bearings that are connected with the gearbox and that for this purpose have such a construction that, in addition to absorbing the radial forces that are to be absorbed with the mounting of the motor shaft, are additionally suitable for absorbing axial forces. Since pursuant to the invention the sun pinion, and the gears of the reduction transmission stage that mesh therewith, are embodied as helical gears having a force component that acts in the direction of the motor shaft bearings, the axial forces that occur can be conducted away in a desired manner into the motor shaft bearings that are connected with the gearbox.

Pursuant to an embodiment of the invention, the sun pinion is supported directly against the sleeve; alternatively, an indirect support of the sun pinion against the sleeve can be provided by disposing an intermediate or spacer disk between sleeve and sun pinion.

Pursuant to an embodiment of the invention, to fix the position of the sun pinion the securing means fixes the sun pinion with preload or bias against the sleeve; this presupposes an appropriate construction of the motor shaft bearing. Preferably, however, the sun pinion is disposed between the sleeve and the securing means with slight axial play.

BRIEF DESCRIPTION OF THE DRAWINGS

An embodiment is shown in the drawing, and will be described subsequently. The single FIGURE shows the motor shaft mounting with coupled-on reduction transmission stage in a sectional illustration.

DESCRIPTION OF SPECIFIC OF SPECIFIC EMBODIMENTS

In conformity with the construction described for the aforementioned driving axle of DE 200 10 563 U1, disposed in a housing 10 that is connected with the chassis of a vehicle is a three-phase or electric motor 11 that acts directly upon a motor shaft 12 for rotating the same.

Connected to the motor shaft 12 is a planetary differential transmission stage that is designated in general by the reference numeral 13, and is accommodated in a gearbox 24 that is connected with the housing 10; the transmission stage transfers the drive movement of the motor shaft 12 to a right drive shaft 14, and to a drive shaft 15 for the drive wheel that is disposed on the opposite, left side of the housing. For this purpose, the left drive shaft 15 is guided through a bore formed in the motor shaft 12. A brake assembly, and a further single-stage planetary gearing for driving the wheels disposed to the outside on the driving axle, respectively follow the two drive shafts 14 and 15, as described in detail in the aforementioned document.

Disposed on the gearbox 24 is an internal gear 16 that is open on its end face that faces the gearbox 24 and to this extent, together with the gearbox 24, surrounds an installation space. In this installation space, a planetary differential cage 17 is rotatably mounted in bearings 18 and is supported on the one hand against the gearbox 24 and on the other hand against the internal gear 16. The motor shaft 12 extends in to the planetary differential cage 17 and carries an externally toothed sun pinion 19 in which engages an externally toothed planet gear 20 that in turn is mounted in the planetary differential cage 17 via a bearing shaft 21. The externally toothed planet gear 20 is furthermore in engagement with the inner toothing of the stationary internal gear 16.

Disposed axially next to the arrangement of sun pinion 19 and planet gear 20 accommodated by the planetary differential cage 17, in the planetary differential cage, in a manner known per se, are the pinions 22 for driving the two drive shafts 14, 15 that extend into the planetary differential cage, and furthermore the compensating gears 23 that are necessary for the function of the differential transmission.

Provided for the mounting of the motor shaft 12 are motor shaft bearings 25 that are connected with the gearbox 24 and that have such a construction that in addition to the radial forces that are to be absorbed for the motor shaft mounting, axial forces are also absorbed and can be conducted away via the gearbox 24 into the housing 10 of the axle. Between the motor shaft bearings 25 and the sun pinion 19, a bushing or sleeve 26 as well as an intermediate or spacer disc 27 are disposed on the motor shaft 12 and form an axial support for the sun pinion 19 that follows the spacer disc 27; the sun pinion 19 is fixed in position on the motor shaft 12 by a nut that is screwed onto the free end of the motor shaft 12 as a securing means 28. In the illustrated embodiment, the sun pinion 19 is disposed with a slight amount of axial play between its axial support against the spacer disc 27 and the securing means 28.

If during the operation of the driving axle the motor shaft 12 is driven at a high speed by the three-phase motor 11, the high speed of the motor shaft 12 is transferred via the sun pinion 19 and the planet gear 20 already with a reduction in speed to the planetary differential cage 17, which in turn drives the pinions 22 with a reduced speed, so that the stress on the pinions 22, as well as on the compensating gears 23, is considerably reduced due to the reduced speed. To the extent that axial forces act upon the sun pinion 19, in particular from the transmission stage via the planetary differential cage 17 and the planet gears 20, these axial forces are transferred from the sleeve 26 with the spacer disc 27, which support the sun pinion 19 against the motor shaft bearings 25, and here are conducted into the gearbox 24 and the housing 10 of the axle.

The features of the subject matter of these documents disclosed in the preceding description, the patent claims and the drawing can be important individually as well as in any combination with one another for realizing the various embodiments of the invention.

The present invention is, of course, in no way restricted to the specific disclosure of the specification and drawings, but also encompasses any modifications within the scope of the appended claims.

The invention claimed is:

1. A driving axle for a vehicle that is driven by an electric motor, comprising:
   a driven motor shaft, wherein said electric motor is disposed on said motor shaft;
   drive shafts coupled to said motor shaft via the interposition of a reduction transmission stage and a following differential transmission, wherein said drive shafts are intended for wheels respectively disposed thereon;
   an externally toothed sun pinion that, as part of said reduction transmission stage, is disposed on said motor shaft, wherein said motor shaft is mounted in motor shaft bearings that are connected to a gearbox of said reduction transmission stage, wherein said motor shaft bearings are embodied as bearings that absorb radial and axial forces;
   a sleeve that is disposed and supported between said motor shaft bearings and said sun pinion;
   a securing means disposed on a free end of said motor shaft for fixing said sun pinion against said sleeve; and
   gears of said reduction transmission stage that mesh with said sun pinion, wherein said sun pinion and said gears are embodied as helical gears having a force component that acts in the direction of said motor shaft bearings.

2. A driving axle according to claim 1, wherein said sun pinion is supported directly against said sleeve.

3. A driving axle according to claim 1, wherein a spacer disk is disposed between said sleeve and said sun pinion.

4. A driving axle according to claim 1, wherein said securing means fixes said sun pinion against said sleeve with bias.

5. A driving axle according to claim 1, wherein said sun pinion is disposed between said sleeve and said securing means with slight axial play.

* * * * *

UNITED STATES PATENT AND TRADEMARK OFFICE
CERTIFICATE OF CORRECTION

PATENT NO. : 7,351,178 B2  Page 1 of 1
APPLICATION NO. : 10/526500
DATED : April 1, 2008
INVENTOR(S) : Karl-Heinz Keuth It is certified that error appears in the above-identified patent and that said Letters Patent is hereby corrected as shown below:

Title Page,

Item [54] and col. 1, line 1, should read as follows:

[54] DIRECTLY DRIVEN AXLE WITH A TRANSMISSION STAGE HAVING AN AXIALLY-FIXED SUN PINION

Signed and Sealed this

Sixteenth Day of December, 2008

JON W. DUDAS
*Director of the United States Patent and Trademark Office*